United States Patent
Schmit (10) Patent No.: US 7,281,134 B2
(45) Date of Patent: Oct. 9, 2007

(54) METHOD AND SYSTEM FOR AUTHENTICATING A SECURITY DEVICE

(75) Inventor: Thomas Schmit, Huntington, NY (US)

(73) Assignee: Honeywell International Inc., Morristown, NJ (US)

( * ) Notice: Subject to any disclaimer, the term of this patent is extended or adjusted under 35 U.S.C. 154(b) by 743 days.

(21) Appl. No.: 10/815,439

(22) Filed: Apr. 1, 2004

(65) Prior Publication Data
US 2005/0228991 A1 Oct. 13, 2005

(51) Int. Cl.
G06F 1/24 (2006.01)
(52) U.S. Cl. ............ 713/182; 713/151; 713/155; 713/161; 713/166; 713/168; 713/169
(58) Field of Classification Search ........... 713/182, 713/151, 155, 161, 166, 168, 169
See application file for complete search history.

(56) References Cited

U.S. PATENT DOCUMENTS

| | | | |
|---|---|---|---|
| 5,771,292 A | 6/1998 | Zunquan | |
| 6,041,409 A | 3/2000 | Zunquan | |

*Primary Examiner*—Thomas R. Peeso
(74) *Attorney, Agent, or Firm*—Anthony R. Barkume, P.C.

(57) ABSTRACT

A method of authenticating a security device to determine if it is authorized to be used with a security system. First and second encryption keys are stored in the control panel and the security device. A challenge message is produced by encrypting, with the first key, a challenge index (such as a random number generated by the control panel). The challenge message is transmitted the security device, where the encrypted challenge index is extracted from the challenge message and then decrypted using the first key at the security device to produce a response index. A response message is produced by encrypting, with the second key, the response index decrypted by the security device. The response message is transmitted to the control panel, and the encrypted response index is extracted and then decrypted using the second key at the control panel to produce the response index. The control panel then compares the response index with the challenge index previously generated. If they are the same, then the control panel indicates that the security device is authentic and allows further communications between the control panel and the security device. If they are not the same, then the control panel indicates that the security device is not authentic and disallows further communications between the control panel and the security device.

35 Claims, 4 Drawing Sheets

METHOD AND SYSTEM FOR AUTHENTICATING A SECURITY DEVICE

FIELD OF THE INVENTION

This invention relates to security and other types of networked systems, and in particular to a method and system for authenticating a security device to determine if it is authorized to be used with the security system.

BACKGROUND OF THE INVENTION

Security systems used to monitor premises and determine if the premises has been breached or an alarm condition exists are well known in the art. These systems typically include a control panel, a systems communications medium such as a data bus, and a number of security devices located throughout the premises for performing a certain function in the system. Security devices typically include glass break sensors, smoke detectors, fire detectors, motion sensors, door and window opening sensors, etc. Security devices also include peripherals such as dialers, keypads, display consoles, RF transmitters and receivers, etc. The control panel is typically configured to communicate with the security devices to collect and send information with these devices, such as when a user enters a "system arm" code in the keypad in order to arm the control panel and the security system.

Due to increasing complexities in security device design and the interaction with the control panel, it has become necessary to use such devices that can operate properly and robustly under the conditions imposed by the system. In some cases, communications between a control panel and the security devices may be encrypted or otherwise secured to ensure that only authorized devices are used in the system. That is, if a security device that is not designed to comport with the rigorous standards of the system is attempted to be used with this type of system, it will likely not operate properly since it has not been programmed with the appropriate encryption methodologies. This is one methodology utilized to ensure that only authorized security devices are used in the system.

It is sometime desired, however, to implement a security system with a communications protocol that is not per se secure, i.e. one that is not encrypted and is sent in the clear. In the situations, it is desired to provide a method of authenticating a security device, both during installation as well as during operation of the system, to ensure that the device has been designed and programmed to operate specifically with the system. It is also desired to prevent someone from substituting a bogus or malicious device into a security system in an attempt to circumvent the security of the system (e.g. gain unauthorized entry). It is desired, therefore, to be able to determine if such a security device is unauthorized and therefore should not be allowed to operate with the system.

SUMMARY OF THE INVENTION

Accordingly, the present invention is a method of authenticating a security device to determine if it is authorized to be used with the security system. The security system has a control panel and a plurality of security devices interconnected to the control panel over a communications medium located in a premises. A first encryption key and a second encryption key are stored in the control panel and in the security device. A challenge index, such as a random number, is generated at the control panel, and a challenge message is produced by encrypting the challenge index using the first encryption key and including the encrypted challenge index in the challenge message. The challenge message is then transmitted over the communications medium to and received by the security device.

At the security device, the encrypted challenge index is extracted from the challenge message and then decrypted using the first encryption key at the security device to produce a response index. A response message is then produced by encrypting the response index using the second encryption key at the security device and including the encrypted response index in the response message. The response message is transmitted over the communications medium by the security device to and received by the control panel.

The encrypted response index is extracted by the control panel from the response message, and then decrypted using the second encryption key at the control panel to produce the response index. The control panel then compares the response index with the challenge index previously generated. If the response index decrypted by the control panel is the same as the challenge index previously generated by the control panel, then the control panel indicates that the security device is authentic (i.e. it has the same encryption keys and encryption/decryption algorithms in its memory as does the control panel) and allows further communications between the control panel and the security device. If, however, the response index decrypted by the control panel is not the same as the challenge index previously generated by the control panel, then the control panel indicates that the security device is not authentic and disallows further communications between the control panel and the security device.

DETAILED DESCRIPTION OF THE INVENTION

Figure 1:
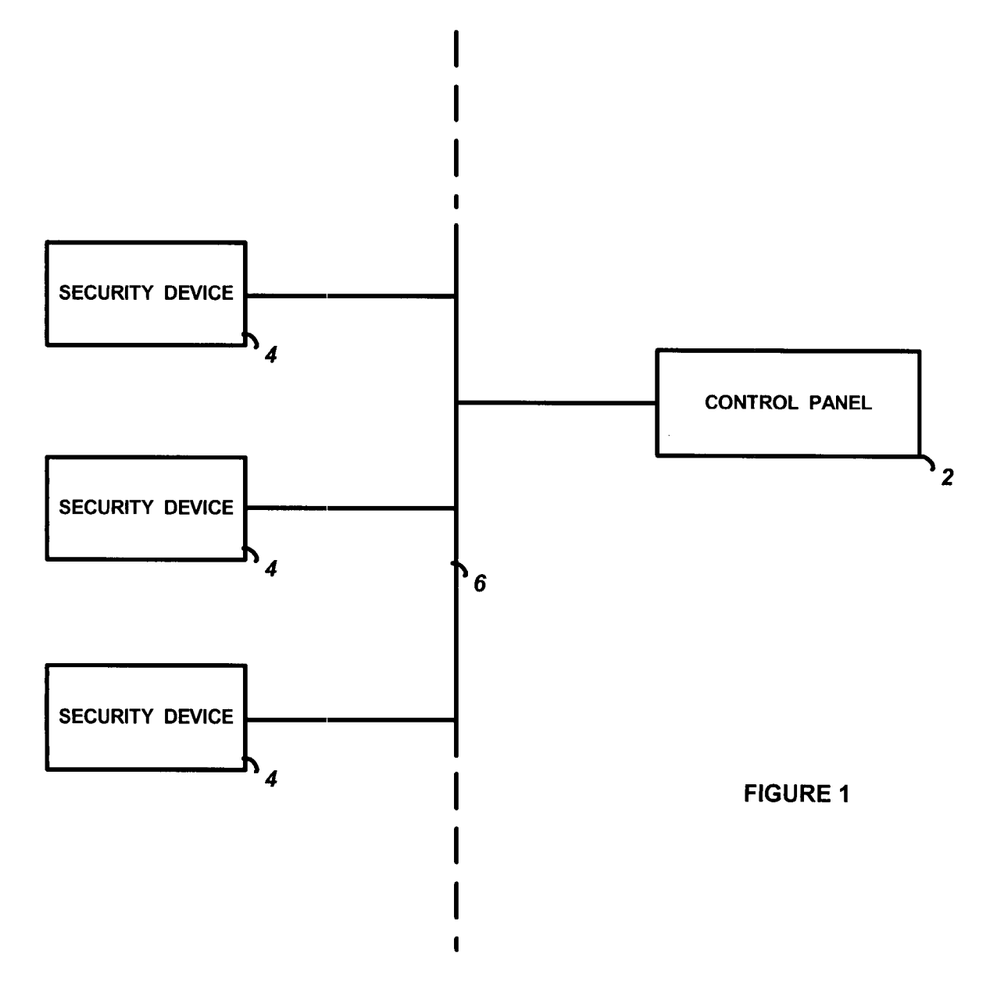
FIG. 1 is a block diagram of a typical security system.

The preferred embodiment of the present invention is now described with reference to the Figures. FIG. 1 illustrates a typical security system that includes a control panel 2, a number of security devices 4, and a communications medium (bus) 6 that allows communication between and amongst the security devices and the control panel as known in the art. The communication medium 6 may be a wired bus or loop, a wireless (e.g. RF) system, or a combination of any type of wired and wireless technologies as well known in the art. As previously indicated, the security devices may be any device that is used in a security system, including but not limited to glass break sensors, smoke detectors, fire detectors, PIR motion sensors, microwave motion sensors, door and window opening sensors, dialers, keypads, display consoles, RF transmitters and receivers, and the like. The security device may also be a gateway, adapter or interface between the control panel and another device. For example, it is common to have an RF receiver connected to a wired communications bus (or loop) to which the control panel is connected. The RF receiver receives messages from another security device such as a wireless PIR sensor (there may also be an RF transmitter for sending messages to the wireless PIR sensor). In this case, both the RF receiver (and/or RF transmitter) as well as the wireless sensors are considered to be security devices in the scope of this invention.

The control panel 2 acts as the system controller for the security system and provides for various functions such as arming and disarming the system, supervising security devices, accepting messages from the security devices to determine if an alarm condition exists, causing an alarm to sound, etc.

Figure 2:
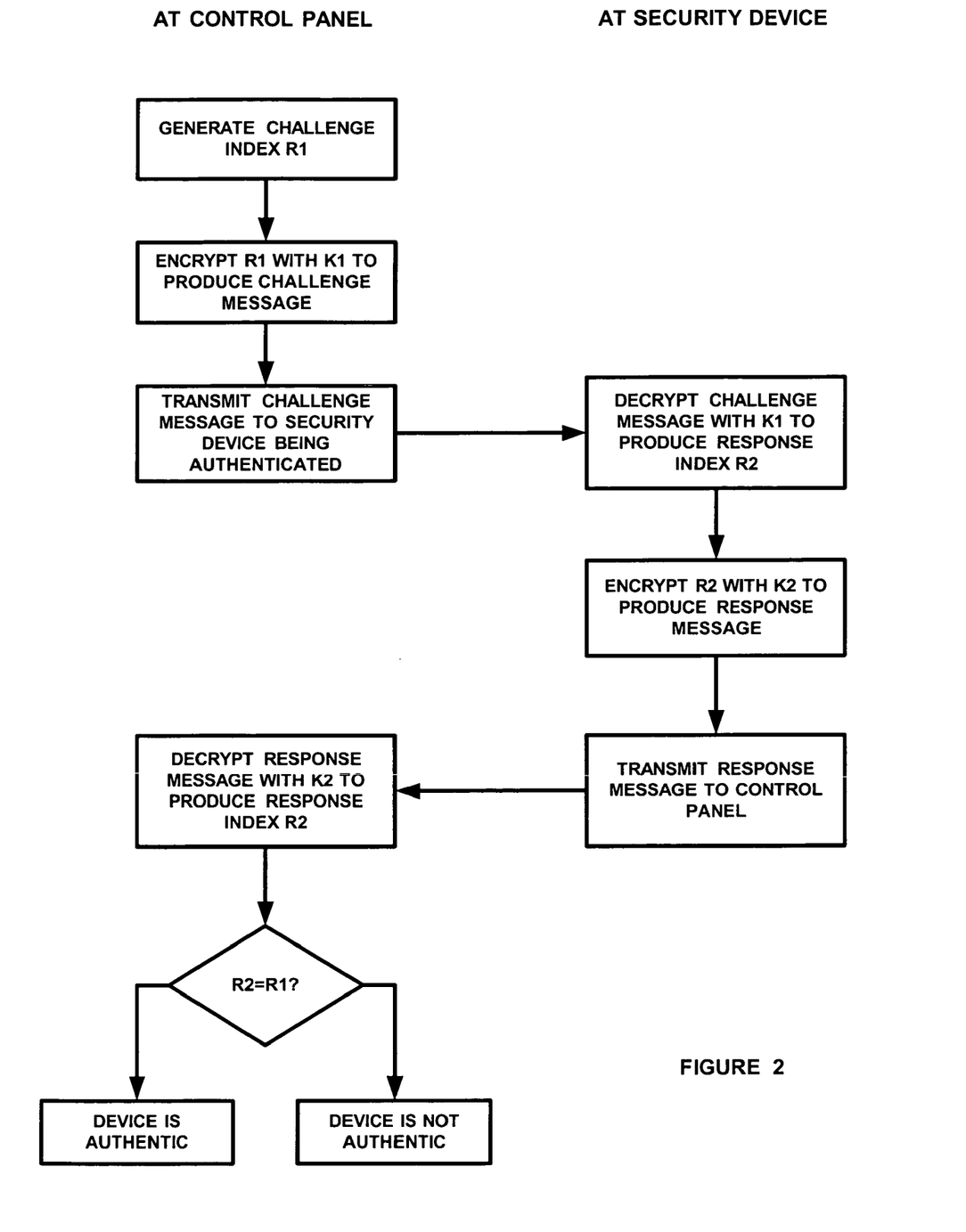
FIG. 2 is a flowchart of the operation of this invention.

Security device authentication will now be described with respect to FIGS. 2, 3 and 4. The authentication process, which may be initiated at installation, will first cause a challenge index to be generated or retrieved from memory. In the preferred embodiment, a challenge random number R1 is generated by random number generator 8 at the control panel 2. Alternatively, the index may be generated in a predetermined manner (such as by an incrementing or decrementing counter). Also, an index may be stored in memory and used for each authentication attempt. The random number is preferred, however, since it is harder to emulate and reproduce in the event that transmissions are captured by an eavesdropper.

Figure 3:
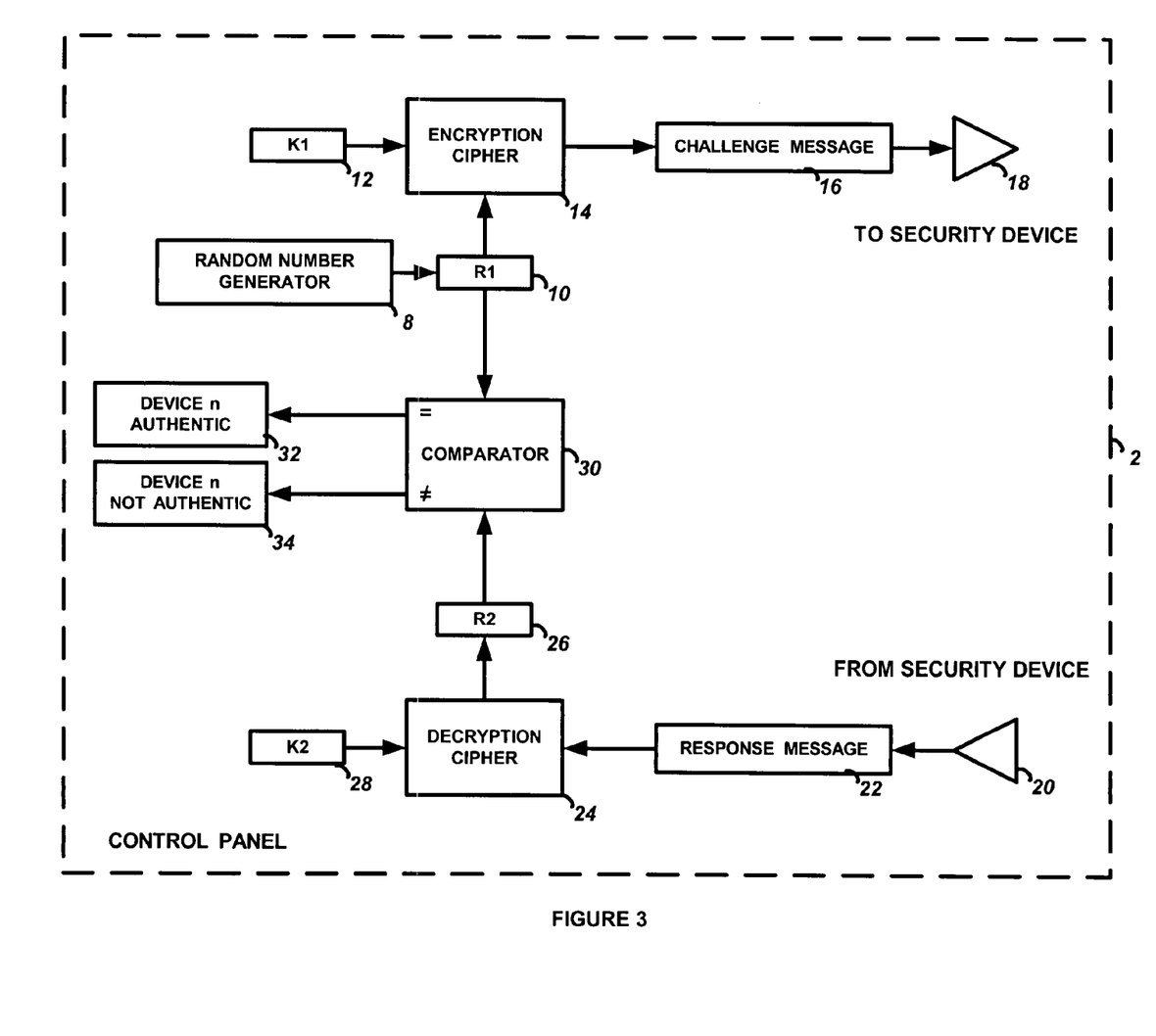
FIG. 3 is a detailed block diagram of the control panel functionality under this invention.
Figure 4:
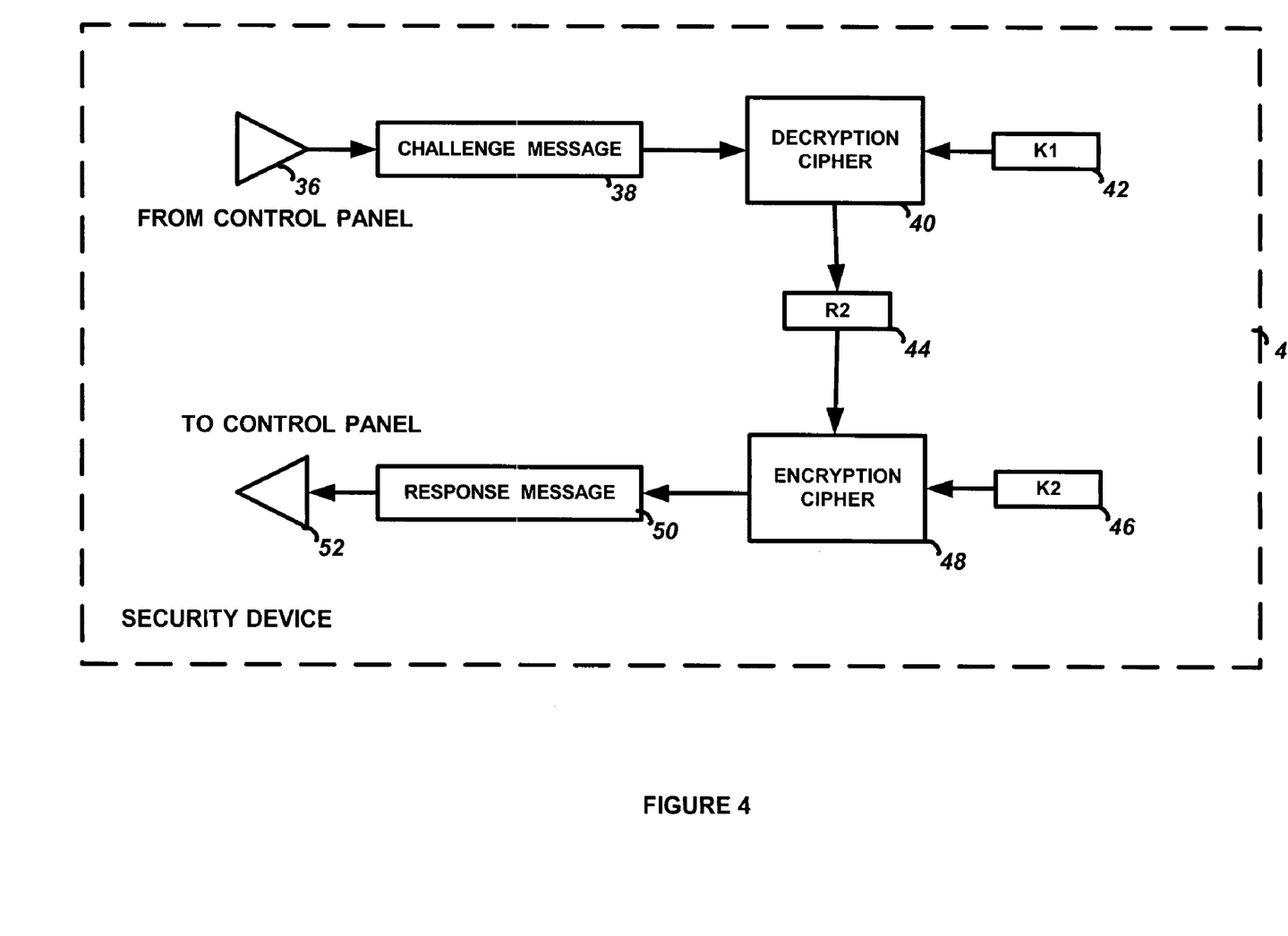
FIG. 4 is a detailed block diagram of the security device functionality under this invention.

Random number R1 is then encrypted by an encryption algorithm 14, using encryption key K1 12 as shown in FIG. 3. Encryption is well known in the art and will modify the random number as a function of the algorithm used as well as the key K1. The encrypted R1 is the used to produce a challenge message 16, which will be sent via data transmitter 18 to the security device 4 that is being authenticated by the control panel 2.

The security device 4 receives the challenge message via data receiver 36, and decrypts the challenge message with a decryption algorithm 40 and encryption key K1 42. Assuming that K1 42 is the same as K1 12, then the index (random number) R2 will be the same as the index (random number) R1 generated by the control panel. Index (random number) R2 is then encrypted using encryption algorithm 48 (which may or may not be the same as encryption algorithm 14 in the control panel) and encryption key K2 46 to produce a response message 50. The response message 50 is transmitted by data transmitter 52 back to the control panel 2.

The control panel receives the response message via its data receiver 20, and then decrypts it using decryption algorithm 24 and encryption key K2 28 to generate R2 26. Assuming that K2 28 is the same as K2 46, then R2 26 will be the same as R2 44, which will be the same as R1 if K1 12 and K1 42 are the same. R2 26 will then be compared by the comparator 30 to determine if there is a match between R1 10 and R2 26. If there is a match, then the security device is deemed to be authentic; if there is no match, then the security device is deemed to be not authentic.

That is, a device that is authentic will have the same encryption keys K1, K2 as the control panel (and the same encryption and decryption algorithms), since they will have been made by the same manufacturer (or authorized and licensed by that manufacturer). As such, the index passed through the system as described above will be the same, after being encrypted and decrypted twice, resulting in a positive comparison. If any of the encryption keys do not match—such as when an unauthorized security device is installed or substituted in the system, then at least one (and likely both) keys K1, K2 will not match with the control panel and the index R2 decrypted at the security device and/or the index R2 decrypted at the control panel will not match the index R1 originally generated by the control panel, resulting in a failed comparison.

If the comparison passes, then the security device is considered to be authentic and a flag or other indicia will be set in memory along with the address (which refers to any identifying indicia such as a device ID or serial number) of the security device authenticated to indicate to the control panel that that device may be properly communicated with in subsequent messages with the control panel. If, however, the comparison fails, then the security device is considered to not be authentic and a flag or other indicia will be set in memory along with the address of the failed security device to indicate to the control panel that that device may not be operated or properly communicated with in subsequent messages with the control panel. That is, a failed authentication will result in the security device being effectively not part of the security system and useless In the event that the device fails authentication, a message may be sent by the control panel to a display in the security system that indicates that the device has failed (e.g. "DOOR SENSOR FAILED AUTHENTICATION—DO NOT USE").

The authentication procedure will be an automated procedure that is initiated every time a new security device is added to the system and the device's address or other ID is "learned" to the control panel as known in the art. It is also possible to provide for a technician to initiate the authentication procedure at any desired time, such as by entering a predetermined function code into a keypad, pressing a dedicated button, etc. Moreover, in addition to (or instead of) executing the authentication procedure as part of the installation process, it may be desired to execute it automatically at periodic times during operation of the system, for example every four hours.

The control panel and security device will have memory and processing circuitry appropriate to carry out the processes described herein. The functionality described above may be embodied in a microprocessor or microcomputer, ASICs, and the like. Memory in the control panel will store the encryption keys K1 and K2, which will likely be programmed at the factory. Memory that normally stores a list of valid addresses for security devices in the system (e.g. those that have been "learned" into the control panel) will be adapted to include a field that indicates if the device is authentic. In the alternative, there may be a routine that will prevent that device from being learned in the control panel if the authentication procedure fails as described above. The circuitry and software necessary to carry out authentication under this invention preferably resides in the system control panel, but it may also reside in any other device (or devices) in the system, including a device dedicated for the purpose of authenticating other security devices.

In addition to having a direct communication between the control panel and the security device (such as when the control panel authenticates an RF receiver/transmitter device that is wired to the communications medium), there may be situations where the control panel will authenticate a wireless sensor with which the RF receiver/transmitter communicates. That is, the RF receiver/transmitter will act an a gateway between the wireless sensor and the control panel, passing data messages from the control panel to the wireless sensor and from the wireless sensor to the control panel as described above.

In addition to security systems as described herein, the present invention may be used in other networked systems such as access control systems, HVAC systems, home automation systems, and the like.

Although the preferred embodiment doesn't require encrypted transmissions to occur between the control panel and the devices, such encrypted or other types of secure transmissions may be used as well. Also, while the preferred embodiment utilizes encryption methodologies, other types of schemes may be used, such as encoding and obfuscation techniques known in the art.

What is claimed is:

1. In a security system comprising a control panel and a plurality of security devices interconnected to the control panel over a communications medium located in a premises, a method of authenticating a security device to determine if it is authorized to be used with the security system, the method comprising the steps of:
   a. storing a first encryption key and a second encryption key in the control panel;
   b. storing the first encryption key and the second encryption key in the security device;
   c. generating a challenge index at the control panel;
   d. producing a challenge message by encrypting the challenge index using the first encryption key at the control panel and including the encrypted challenge index in the challenge message;
   e. transmitting the challenge message over the communications medium to the security device;
   f. receiving at the security device the challenge message over the communications medium from the control panel;
   g. extracting the encrypted challenge index from the challenge message;
   h. decrypting the encrypted challenge index using the first encryption key at the security device to produce a response index;
   i. producing a response message by encrypting the response index using the second encryption key at the security device and including the encrypted response index in the response message;
   j. transmitting the response message over the communications medium to the control panel;
   k. receiving at the control panel the response message over the communications medium from the security device;
   l. extracting the encrypted response index from the response message;
   m. decrypting the encrypted response index using the second encryption key at the control panel to produce the response index;
   n. comparing the response index decrypted by the control panel with the challenge index generated by the control panel;
      i. if the response index decrypted by the control panel is the same as the challenge index generated by the control panel, then indicating that the security device is authentic and allowing further communications between the control panel and the security device; and
      ii. if the response index decrypted by the control panel is not the same as the challenge index generated by the control panel, then indicating that the security device is not authentic and disallowing further communications between the control panel and the security device.

2. The method of claim 1 wherein the method is performed during installation of the security device in the security system.

3. The method of claim 1 wherein the method is performed on a periodic basis during operation of the security system.

4. The method of claim 1 wherein, if the response index decrypted by the control panel is not the same as the challenge index generated by the control panel, then sending a non-authentication message to a display device interconnected to the communications medium and displaying a message on the display device that indicates that authentication of the security device has failed.

5. The method of claim 1 wherein, if the response index decrypted by the control panel is not the same as the challenge index generated by the control panel, then setting a flag in memory indicating that the authentication of the security device has failed.

6. The method of claim 1 wherein the index is a randomly generated number.

7. The method of claim 1 wherein the control panel and the security device communicate with each other via a gateway device.

8. In a security system comprising a control panel and a plurality of security devices interconnected to the control panel over a communications medium located in a premises, a method for a control panel to authenticate a security device to determine if it is authorized to be used with the security system, the method comprising the steps of:
   a. storing a first encryption key and a second encryption key in the control panel;
   b. generating a challenge index at the control panel;
   c. producing a challenge message by encrypting the challenge index using the first encryption key at the control panel and including the encrypted challenge index in the challenge message;
   d. transmitting the challenge message over the communications medium to the security device;
   e. receiving at the control panel a response message over the communications medium from the security device;
   f. extracting an encrypted response index from the response message;
   g. decrypting the encrypted response index using the second encryption key at the control panel to produce the response index;
   h. comparing the response index decrypted by the control panel with the challenge index generated by the control panel;
      i. if the response index decrypted by the control panel is the same as the challenge index generated by the control panel, then indicating that the security device is authentic and disallowing further communications between the control panel and the security device; and
      ii. if the response index decrypted by the control panel is not the same as the challenge index generated by the control panel, then indicating that the security device is not authentic and disallowing further communications between the control panel and the security device.

9. The method of claim 8 wherein the index is a randomly generated number.

10. In a security system comprising a control panel and a plurality of security devices interconnected to the control panel over a communications medium located in a premises, a method for a security device to respond to an authentication request to determine if it is authorized to be used with the security system, the method comprising the steps of:
   a. storing a first encryption key and a second encryption key in the security device;

b. receiving at the security device a challenge message over the communications medium from the control panel;
c. extracting an encrypted challenge index from the challenge message;
d. decrypting the encrypted challenge index using the first encryption key at the security device to produce a response index;
e. producing a response message by encrypting the response index using the second encryption key at the security device and including the encrypted response index in the response message; and
f. transmitting the response message over the communications medium to the control panel.

11. The method of claim 10 wherein the index is a randomly generated number.

12. A security system comprising:
a. a control panel;
b. a plurality of security devices; and
c. a communications medium interconnecting the plurality of security devices with the control panel;
d. wherein the control panel comprises:
 (i) a memory that stores a first encryption key and a second encryption key; and
 (ii) processing circuitry adapted to:
  (a) generate a challenge index;
  (b) produce a challenge message by encrypting the challenge index using the first encryption key and including the encrypted challenge index in the challenge message; and
  (c) transmit the challenge message over the communications medium to a security device being authenticated for use with the security system;
e. wherein the security device being authenticated for use with the security system comprises:
 (i) a memory that stores the first encryption key and the second encryption key; and
 (ii) processing circuitry adapted to:
  (a) receive the challenge message over the communications medium from the control panel;
  (b) extract the encrypted challenge index from the challenge message;
  (c) decrypt the encrypted challenge index using the first encryption key stored at the security device to produce a response index;
  (d) produce a response message by encrypting the response index using the second encryption key stored at the security device and including the encrypted response index in the response message; and
  (e) transmit the response message over the communications medium to the control panel; and
f. wherein the processing circuitry at the control panel is further adapted to:
 (i) receive the response message over the communications medium from the security device;
 (ii) extract the encrypted response index from the response message;
 (iii) decrypt the encrypted response index using the second encryption key stored at the control panel to produce the response index;
 (iv) compare the response index decrypted by the control panel with the challenge index generated by the control panel; and
  (a) if the response index decrypted by the control panel is the same as the challenge index generated by the control panel, then indicate that the security device is authentic and allow further communications between the control panel and the security device; and
  (b) if the response index decrypted by the control panel is not the same as the challenge index generated by the control panel, then indicate that the security device is not authentic and disallow further communications between the control panel and the security device.

13. The system of claim 12 wherein, if the response index decrypted by the control panel is not the same as the challenge index generated by the control panel, the processing circuitry at the control panel is further adapted to set a flag in memory indicating that the authentication of the security device has failed.

14. The system of claim 12 further comprising a display device interconnected to the communications bus, and wherein, if the response index decrypted by the control panel is not the same as the challenge index generated by the control panel, the processing circuitry at the control panel is further adapted to send a non-authentication message to a display device interconnected to the communications bus, and wherein the display device is adapted to display a message that indicates that authentication of the security device has failed.

15. The system of claim 12 wherein the processing circuitry is adapted to generate a challenge index by generating a random number.

16. A control panel for use with a security system comprising:
a. a memory that stores a first encryption key and a second encryption key; and
b. processing circuitry adapted to:
 (i) generate a challenge index;
 (ii) produce a challenge message by encrypting the challenge index using the first encryption key and including the encrypted challenge index in the challenge message; and
 (iii) transmit the challenge message over a communications medium to a security device being authenticated for use with the security system;
 (iv) receive a response message over the communications medium from the security device;
 (v) extract an encrypted response index from the response message;
 (vi) decrypt the encrypted response index using the second encryption key stored at the control panel to produce the response index;
 (vii) compare the decrypted response index with the generated challenge index generated; and
  (a) if the response index decrypted by the control panel is the same as the challenge index generated by the control panel, then indicate that the security device is authentic and allow further communications between the control panel and the security device; and
  (b) if the response index decrypted by the control panel is not the same as the challenge index generated by the control panel, then indicate that the security device is not authentic and disallow further communications between the control panel and the security device.

17. The control panel of claim 16 wherein the processing circuitry is adapted to generate a challenge index by generating a random number.

18. A security device for use with a security system comprising:

a. a memory that stores a first encryption key and a second encryption key; and
b. processing circuitry adapted to:
  i. receive a challenge message over a communications medium from a control panel;
  ii. extract an encrypted challenge index from the challenge message;
  iii. decrypt the encrypted challenge index using the first encryption key stored at the security device to produce a response index;
  iv. produce a response message by encrypting the response index using the second encryption key stored at the security device and including the encrypted response index in the response message; and
  v. transmit the response message over the communications medium to the control panel.

19. The device of claim 18 wherein the index is a random number.

20. The security device of claim 18 further comprising a security sensor for detecting a change in condition in a surrounding environment.

21. The security device of claim 20 wherein the security sensor is a passive infrared motion detector.

22. The security device of claim 20 wherein the security sensor is a microwave motion detector.

23. The security device of claim 20 wherein the security sensor is a door opening sensor.

24. The security device of claim 20 wherein the security sensor is a glass breakage detector.

25. The security device of claim 20 wherein the security sensor is a smoke alarm.

26. The security device of claim 20 wherein the security sensor is a window opening detector.

27. The security device of claim 18 further comprising a security alarm sounder.

28. The security device of claim 18 further comprising a data entry device.

29. The security device of claim 18 further comprising a visual display.

30. The security device of claim 18 further comprising a dialer unit.

31. The security device of claim 18 further comprising an RF receiver.

32. The security device of claim 18 further comprising an RF transmitter.

33. The security device of claim 18 further comprising a bus gateway.

34. In a security system comprising a plurality of security devices interconnected over a communications medium located in a premises, wherein a first security device of said plurality of security devices is known to be authentic, a method of authenticating a second security device to determine if it is authorized to be used with the security system, the method comprising the steps of:
  a. storing a first encryption key and a second encryption key in the first security device;
  b. storing the first encryption key and the second encryption key in the second security device;
  c. generating a challenge index at the first security device;
  d. producing a challenge message by encrypting the challenge index using the first encryption key at the first security device and including the encrypted challenge index in the challenge message;
  e. transmitting the challenge message over the communications medium to the second security device;
  f. receiving at the second security device the challenge message over the communications medium from the first security device;
  g. extracting the encrypted challenge index from the challenge message;
  h. decrypting the encrypted challenge index using the first encryption key at the second security device to produce a response index;
  i. producing a response message by encrypting the response index using the second encryption key at the second security device and including the encrypted response index in the response message;
  j. transmitting the response message over the communications medium to the first security device;
  k. receiving at the first security device the response message over the communications medium from the second security device;
  l. extracting the encrypted response index from the response message;
  m. decrypting the encrypted response index using the second encryption key at the first security device to produce the response index;
  n. comparing the response index decrypted by the first security device with the challenge index generated by the first security device;
    i. if the response index decrypted by the first security device is the same as the challenge index generated by the first security device, then indicating that the second security device is authentic and allowing further communications between the first security device and the second security device; and
    ii. if the response index decrypted by the first security device is not the same as the challenge index generated by the first security device, then indicating that the second security device is not authentic and disallowing further communications between the first security device and the second security device.

35. A security system comprising:
a. a plurality of security devices comprising a first security device known to be authentic and a second security device to be authenticated for use with the security system; and
b. a communications medium interconnecting the plurality of security devices;
c. wherein the first security device comprises:
  i. a memory that stores a first encryption key and a second encryption key; and
  ii. processing circuitry adapted to:
    (a) generate a challenge index;
    (b) produce a challenge message by encrypting the challenge index using the first encryption key and including the encrypted challenge index in the challenge message; and
    (c) transmit the challenge message over the communications medium to the second security device;
d. wherein the second security device comprises:
  i. a memory that stores the first encryption key and the second encryption key; and
  ii. processing circuitry adapted to:
    (a) receive the challenge message over the communications medium from the first security device;
    (b) extract the encrypted challenge index from the challenge message;

(c) decrypt the encrypted challenge index using the first encryption key stored at the second security device to produce a response index;

(d) produce a response message by encrypting the response index using the second encryption key stored at the second security device and including the encrypted response index in the response message; and (e) transmit the response message over the communications medium to the first security device;

e. wherein the processing circuitry at the first security device is further adapted to:

i. receive the response message over the communications medium from the second security device;

ii. extract the encrypted response index from the response message;

iii. decrypt the encrypted response index using the second encryption key stored at the first security device to produce the response index;

iv. compare the response index decrypted by the first security device with the challenge index generated by the first security device; and (a) if the response index decrypted by the first security device is the same as the challenge index generated by the first security device, then indicate that the second security device is authentic and allow further communications between the first security device and the second security device; and (b) if the response index decrypted by the first security device is not the same as the challenge index generated by the first security device, then indicate that the second security device is not authentic and disallow further communications between the first security device and the second security device.

* * * * *